(12) United States Patent
Habif

(10) Patent No.: US 10,649,085 B2
(45) Date of Patent: *May 12, 2020

(54) SYSTEM AND METHOD FOR AUTHENTICATED INTERROGATION OF A TARGET WITH QUANTUM ENTANGLEMENT

(71) Applicant: RAYTHEON BBN TECHNOLOGIES CORP., Cambridge, MA (US)

(72) Inventor: Jonathan L. Habif, Arlington, MA (US)

(73) Assignee: Raytheon BBN Technologies Corp., Cambridge, MA (US)

(*) Notice: Subject to any disclaimer, the term of this patent is extended or adjusted under 35 U.S.C. 154(b) by 178 days.

This patent is subject to a terminal disclaimer.

(21) Appl. No.: 15/783,747

(22) Filed: Oct. 13, 2017

(65) Prior Publication Data
US 2018/0038956 A1 Feb. 8, 2018

Related U.S. Application Data

(63) Continuation of application No. 14/600,764, filed on Jan. 20, 2015, now Pat. No. 9,791,567.

(51) Int. Cl.
| | |
|---|---|
| *G01C 3/08* | (2006.01) |
| *G01S 17/10* | (2020.01) |
| *G01S 7/292* | (2006.01) |
| *G01S 7/36* | (2006.01) |
| *G01S 7/487* | (2006.01) |
| *G01S 7/495* | (2006.01) |
| *G01S 13/10* | (2006.01) |

(52) U.S. Cl.
CPC .............. *G01S 17/10* (2013.01); *G01S 7/292* (2013.01); *G01S 7/36* (2013.01); *G01S 7/487* (2013.01); *G01S 7/495* (2013.01); *G01S 13/10* (2013.01)

(58) Field of Classification Search
CPC .......... G01S 17/00; G01S 7/292; G01S 7/487; G01S 7/35; G01S 7/495; G01S 13/10
USPC ......................................................... 356/4.01
See application file for complete search history.

(56) References Cited

U.S. PATENT DOCUMENTS

| | | | |
|---|---|---|---|
| 6,690,472 B2 * | 2/2004 | Kulp ....................... | G01M 3/38 250/330 |
| 7,362,420 B2 | 4/2008 | Zaugg | |

(Continued)

OTHER PUBLICATIONS

Zhang, Zheshen et al.; "Entanglement's Benefit Survives an Entanglement-Breaking Channel"; Physical Review Letters; American Physical Society; Jul. 5, 2013; PRL 111; pp. 010501-1-010501-5 (5 pages).

*Primary Examiner* — Mark Hellner
(74) *Attorney, Agent, or Firm* — Lewis Roca Rothgerber Chrisite LLP

(57) ABSTRACT

A method and apparatus for authenticating a radar return signal include: generating an outgoing radar beam; generating a pair of entangled photons comprising a signal photon and an idler photon; combining the signal photon with the outgoing radar beam to generate a combined beam; sending the combined beam towards a target; receiving a return beam; detecting the signal photon from the return beam by a quantum illumination receiver; and making a joint detection with the idler photon.

20 Claims, 4 Drawing Sheets

(56) References Cited

U.S. PATENT DOCUMENTS

| | | | |
|---|---|---|---|
| 7,767,976 B2 * | 8/2010 | Allen | G01S 17/00 |
| | | | 250/393 |
| 7,989,775 B2 | 8/2011 | Allen et al. | |
| 8,339,581 B2 | 12/2012 | Guha et al. | |
| 9,791,567 B2 * | 10/2017 | Habif | G01S 17/10 |
| 2010/0277712 A1 | 11/2010 | Zaugg | |
| 2016/0018525 A1 | 1/2016 | Lanzagorta | |

* cited by examiner

SYSTEM AND METHOD FOR AUTHENTICATED INTERROGATION OF A TARGET WITH QUANTUM ENTANGLEMENT

CROSS-REFERENCE TO RELATED APPLICATION

This application is a continuation of U.S. patent application Ser. No. 14/600,764, filed Jan. 20, 2015, issued Oct. 17, 2017 as U.S. Pat. No. 9,791,567, the entire contents of which are incorporated herein by reference.

FIELD OF THE INVENTION

This invention generally relates to enhanced signal sensing systems, and more specifically to a system and method for authenticated interrogation of a returned signal with quantum entanglement.

BACKGROUND

Optical ranging and target detection have become an important capability for imaging systems, offering 3D reconstruction of standoff targets and enabling tasks such as, target identification, characterization and orientation. Optical ranging and target detection may be performed by laser or radar. Typically, laser ranging is performed using a short pulsed laser, and a high-speed photodetector, measuring time of flight of the optical pulse and then calculating the distance to the target, given the speed of optical pulse (light).

However, modern radar systems are susceptible to jamming techniques capable of "spoofing" the transmitted radar signals, before they are received back. Classical electromagnetic (EM) radiation can be measured, copied and modified (spoofed), unbeknownst to the receiver. For example, a digital RF (radio frequency) Memory (DRFM) may be used to spoof or jam a radar (return) signal. A DRFM is an electronic method for digitally capturing and retransmitting RF signal. DRFMs are typically used in radar jamming, among other applications. A typical DRFM system digitizes an incoming RF input signal at a given frequency and bandwidth to adequately represent the signal, and then reconstructs that RF signal when required. The most significant aspect of DRFM is that as a digital "duplicate" of the received signal, it is coherent with the source of the received signal. More relevantly, a DRFM may modify the signal before retransmitting it. This modification can alter the signature of a target by adjusting its apparent radar cross section, range, velocity, and/or angle. Accordingly, DRFMs present a significant obstacle for radar sensors.

Techniques in pulse shaping of classical radiation have typically been used to try to defeat DRFM, however, these techniques merely make it difficult for a target to spoof a radar or laser detection and ranging (ladar) signal and thus do not provide for the physical impossibility of spoofing.

The present invention capitalizes on the no-cloning theorem and the properties of quantum entanglement of quantum mechanics to detect any spoofing or jamming of a radar/ladar system.

SUMMARY

The present invention is a system and method for authenticated interrogation of a returned signal with quantum entanglement. In some embodiments, the present invention uses the technique of "quantum illumination" to verify that the radar pulse returning to a radar receiver is the same EM pulse that was generated by the radar transmitter and thus insuring that the same transmitted pulse underwent reflection from the target, without being modified or regenerated by the target under interrogation.

In some embodiments, the present invention is a method for authenticating a radar return signal. The method includes: generating an outgoing radar beam; generating a pair of entangled photons comprising a signal photon and an idler photon; combining the signal photon with the outgoing radar beam to generate a combined beam; sending the combined beam towards a target; receiving a return beam; detecting the signal photon from the return beam by a quantum illumination receiver; and making a joint detection with the idler photon.

In some embodiments, the present invention is an apparatus for authenticating a radar return signal. The apparatus includes a radar for generating an outgoing radar beam; an entanglement generation device generating a pair of entangled photons comprising a signal photon and an idler photon; a combiner for combining the signal photon with the outgoing radar beam to generate a combined beam; a radar transmitter for sending the combined beam towards a target; a radar receiver for receiving a return beam; a quantum illumination receiver for detecting the signal photon from the return beam and making a joint detection with the idler photon; and a processor for comparing the joint detection with a predetermined threshold.

The outgoing radar beam and the return beam may be optical signal, such as laser beams, or electromagnetic signals, such as X-band or RF signals. That is, the radar may be operating in an optical domain or in an electrical domain.

DETAILED DESCRIPTION

In some embodiments, the present invention comprises of a radar or ladar that transmits a pulse, measures the return pulse reflected from a target indicating the presence of the target and information about the target. The invention verifies that the return pulse is the same pulse that was transmitted by the radar/ladar.

Figure 1:
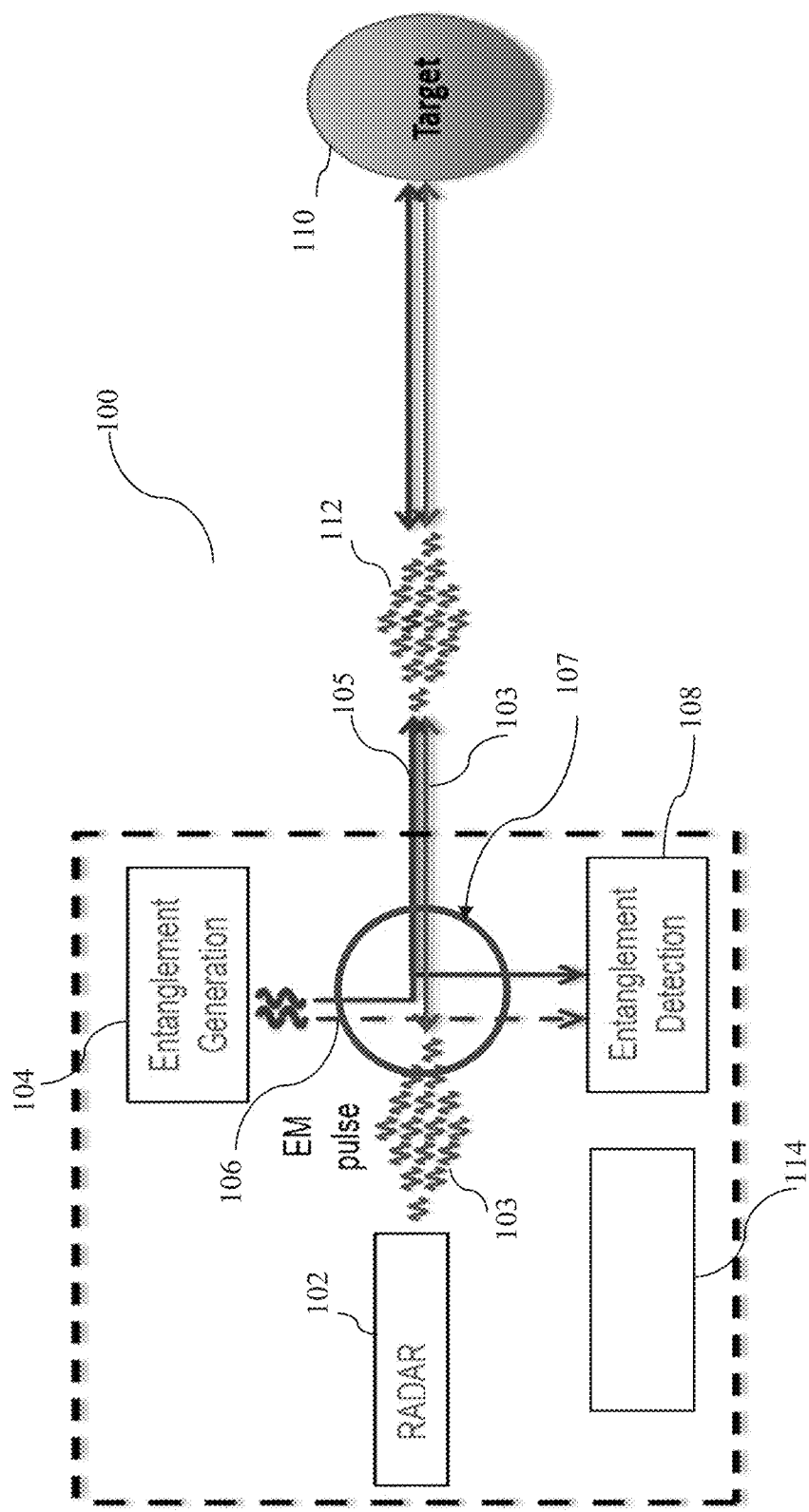
FIG. 1 is an exemplary block diagram of a quantum enhanced radar system, according to some embodiments of the present invention.

FIG. 1 is an exemplary block diagram of a quantum enhanced radar system 100, according to some embodiments of the present invention. As shown, a radar or ladar system 102 transmits an optical or electro-magnetic (EM) pulse 103 towards a target 110. The radar or ladar system 102 includes a (classical) processor with associated circuitry and memory (not shown) for processing the return signals for detection of the target and its information. The EM pulse is reflected from target 110 and is then measured indicating the presence of the target and yielding rage and target location information. To validate the veracity of the return pulse (for example, to make sure it hasn't been spoofed), a quantum entangled pair (state) is generated by an entanglement generation module/device 104. The quantum entangled state pair comprises of a signal photon 105 and an idler photon 106. The signal photon 105 is entangled (combined) with the transmitted (outgoing) EM signal 103 by a combiner 107 and sent towards the target. In the case of an optical radar, combiner 107 may be a beam splitter. In the case of an RF signal, combiner 107 may be a resistive splitter/combiner network. Some examples of sources of entangled photons include nonlinear crystals in the optical domain, or superconducting circuits in the RF domain.

Generally, quantum entanglement is a physical phenomenon that occurs when pairs or groups of particles are generated or interact in ways such that the quantum state of each particle cannot be described independently—instead, a quantum state may be given for the system as a whole. Typically, quantum entanglement refers to correlating the quantum mechanical state of one photon in a photon pair with the quantum mechanical state of the other photon in the pair, in a way that is stronger than the classical systems. For instance, if the polarization state, frequency or wavelength of one of the photons is known, then the polarization state, frequency or wavelength of the other photon is also known. Quantum entanglement can be created by nonlinear crystals which are pumped by lasers. This entanglement source is an example of one in the optical domain. Other examples and description of quantum entanglement is provided in M. A. Castellanos-Beltran, K. D. Irwin, G. C. Hilton, L. R. Vale and K. W. Lehnert, "Amplification and squeezing of quantum noise with a tunable Josephson metamaterial," Nature Physics 4, 929 (2008), the entire contents of which is hereby expressly incorporated by reference.

The idler photon 106 is sent to an entanglement detection module 108 directly or stored in a quantum memory 114 for access by the entanglement detection module (quantum illumination receiver) 108. The return signal includes the signal photon 105, the radar return pulse and may include some noise 112. The return signal is measured in the quantum illumination receiver 108, to verify that the signal photon 105 from the entangled pair is still in the return state. That is, the signal photon 105 is compared with the idler photon 106 (directly received from the entanglement generation module 104 or accessed from the quantum memory 114. If the signal photon 105 in the return pulse is not measured (not matched with the idler photon 106), there is a strong indication that the return pulse being processed is the result of (DRFM) spoofing. Accordingly, the radar/ladar system attempts to search for the "real" return pulse.

In some embodiments, the quantum illumination receiver outputs an electrical (current) signal, as the joint detection, which is compared to a threshold value (by the processor) to determine whether the return signal is an authentic return of the transmitted radar signal or a spoofed version of it. The current output signal is a measure of the intensities of the idler photon and the signal photon that is converted to an electrical signal, as explained below, with respect to FIG. 3.

Figure 2:
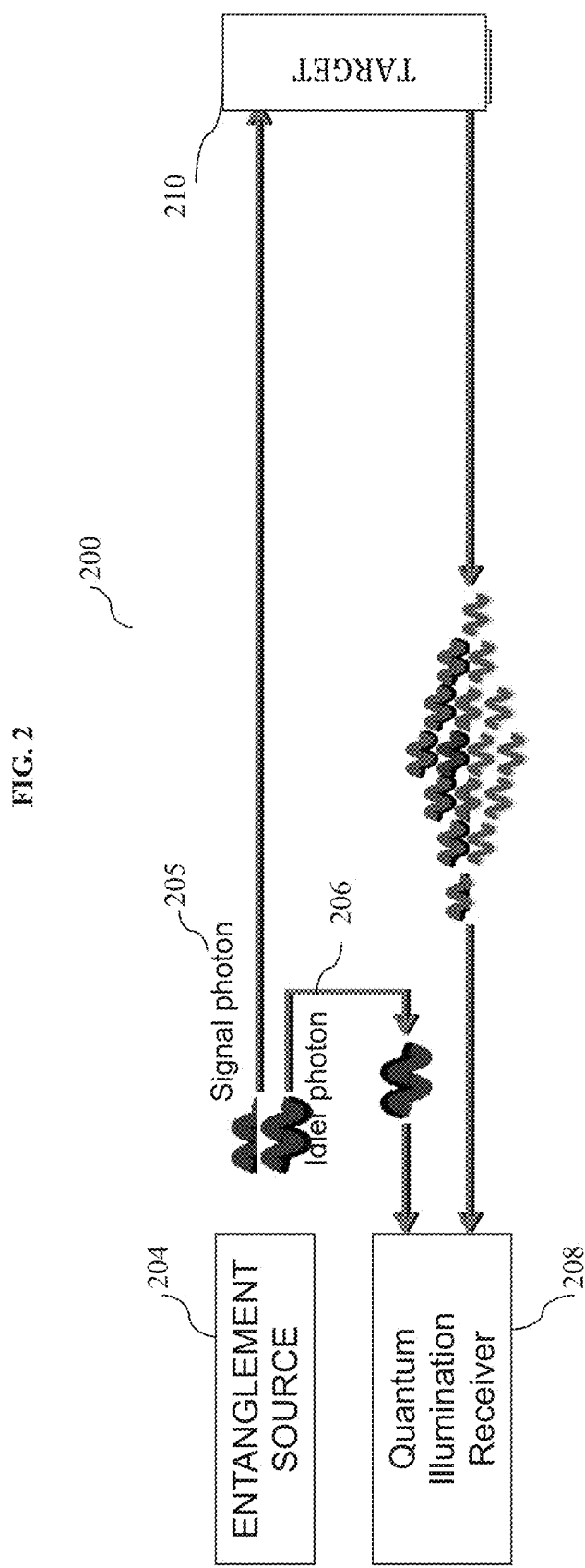
FIG. 2 illustrates a quantum illumination concept for target detection, according to some embodiments of the present invention.

FIG. 2 illustrates a quantum illumination concept for target detection, according to some embodiments of the present invention. As shown, a quantum entangled state, which includes a signal photon 205 and an idler photon 206, is generated by an entanglement source. The signal photon 205 is sent towards a target 210 and the idler photon 206 is sent directly towards a quantum illumination receiver 208 or stored in a quantum memory to be accessed by the receiver 208. The signal photon 205 bounces back from the target 210 toward a quantum illumination receiver 208. Typically, a small return signal and high background noise are returned. In some embodiments, the quantum illumination receiver distinguishes the weak signal photon from the strong radar return by capitalizing on the initial entanglement between the signal and idler photons.

In some embodiments, the quantum illumination receiver 208 uses quantum illumination technique to verify that the radar pulse returning to a radar receiver is the same signal (optical/laser or EM pulse) that was generated by the radar transmitter, by measuring the signal photon 205, that is, comparing it to the originally entangled idler photon 206. The known quantum-illumination method uses quantum-mechanically entangled light to interrogate or illuminate distant objects, significant enhancements may be achieved over the use of unentangled/coherent classical light for detecting those objects.

An example of a quantum illumination receiver is described in the U.S. Pat. No. 8,339,581, the entire contents of which are hereby expressly incorporated by reference. The above-mentioned exemplary quantum illumination receiver includes a phase-conjugation and mixing circuit for outputting an output beam representative of the contents of the target region and a beam collector for receiving a return beam from the target region and directing the return beam to the phase-conjugation and mixing circuit. The receiver also includes an optical input for receiving an idler beam (or photon) and for directing the idler beam to the phase-conjugation and mixing circuit. A sensor then measures the output of the phase-conjugation and mixing circuit. The receiver may be in communication with a processor configured to process the output of the sensor to detect the presence or absence of a target in the target region.

In some embodiments, a similar receiver is used by the present invention as the quantum illumination receiver, which uses quantum illumination method to verify that the radar pulse returning to a radar receiver is the same EM pulse that was generated by the radar transmitter, by measuring the signal photon 205 and comparing it to the idler photon 206. An experimental demonstration of an entanglement-based secure communication technique that is resilient to loss and noise is described in Zheshen Zhang, Maria Tengner, Tian Zhong, Franco N. C. Wong, and Jeffrey H. Shapiro, "Entanglement's benefit survives an entanglement-breaking channel," Phys. Rev. Lett. 111, 010501 (2013) ("[1]"), the entire contents of which are hereby expressly incorporated by reference. A quantum illumination receiver that uses nonlinear interaction mediated with optically transparent crystal, for example, a PPLN or PPKTP crystal, is explained in detail in S. Guha and B. I. Erkmen, "Receiver Design for Gaussian state Quantum Illumination," Phys. Rev. A 80, 052310 (2009) ("[2]"), the entire contents of which are hereby expressly incorporated by reference; and the commonly owned U.S. Pat. No. 8,339,581.

Figure 3:
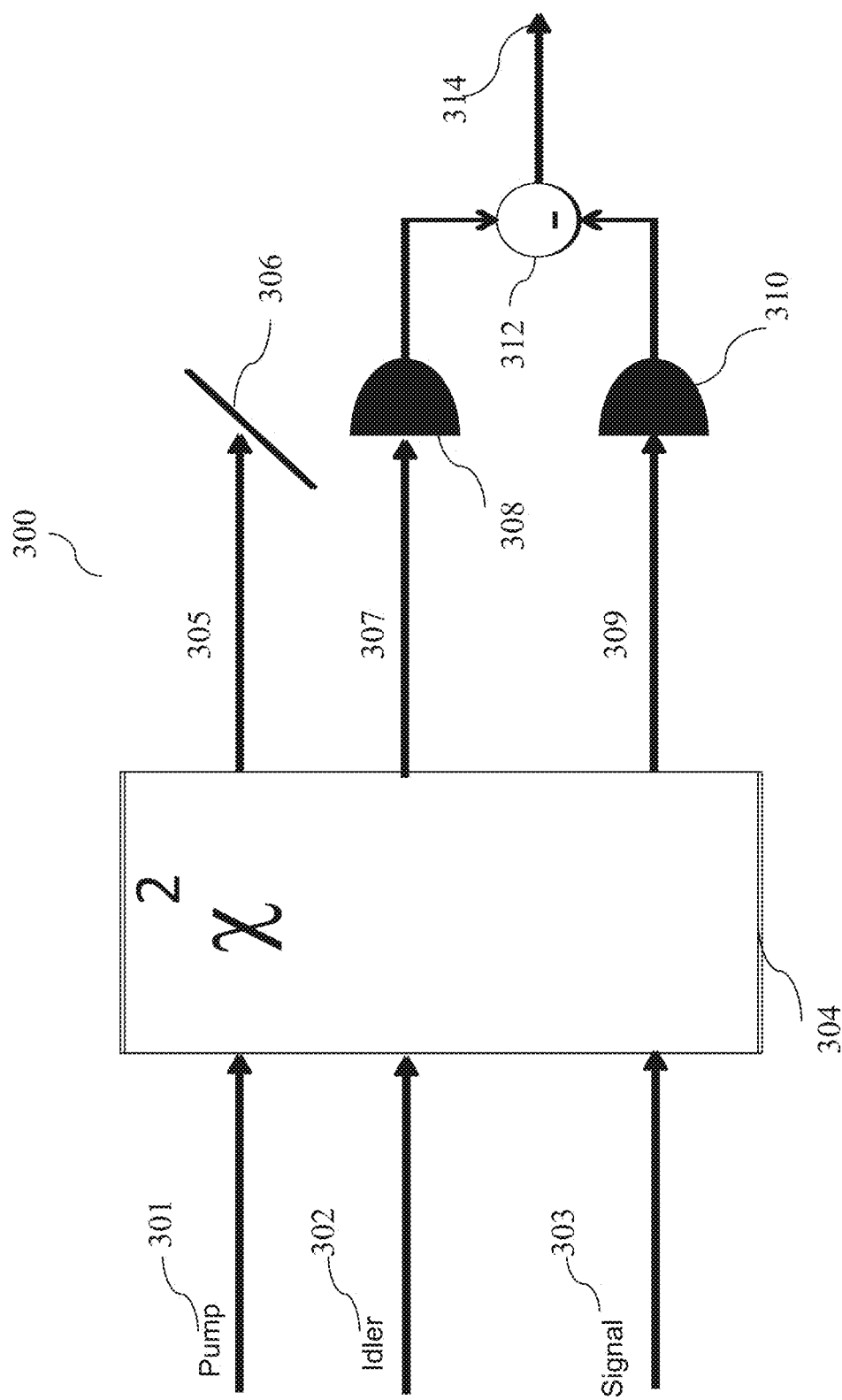
FIG. 3 is an exemplary block diagram of a quantum illumination receiver, according to some embodiments of the present invention.

FIG. 3 is an exemplary block diagram of a quantum illumination receiver 300, according to some embodiments of the present invention. Signal 303 is the radar return signal that is supposed to include the signal photon. Pump 301 is a laser source that generates a laser beam used to mediate the amplification of the signal 303 relative to the idler photon 302 to make the detection more accurate. In some embodiments, the strength of the pump signal is chosen to achieve a gain only slightly greater than unity. The optical parametric amplification (OPA) device 304 detects the quantum illumination using, for example, $\kappa^2$ or $\kappa^3$ type of non-linarites that improves OPA. Other types of non-linarites known in the art may also be used by the OPA device 304. The idler photon 302 is input to the OPA device 304, after it is being delayed (for example, by a quantum memory). The output pump signal 305 is absorbed by a light absorber material 306 and discarded.

The output optical signal 307 is a mixture of the idler photon 302 and the signal 303; and the output optical signal 309 is a different mixture of the idler photon 302 and the signal 303. The output optical signals 307 and 309 are mixed due to the process of parametric amplification, described in more detail by FIG. 2 and equations 3 and 4 in [2]. The two output optical signals (307 and 309) are then optically detected and converted to electrical current by the two (single photon) optical detectors 308 and 310, respectively. In some embodiments, the optical intensities of both of the signal output and the idler output are measured by using single photon sensitive detectors. Examples of these detectors are: avalanche photodiodes operated in the Gieger mode, or superconducting nano-wire detectors.

The resulting signal currents are then subtracted from each other by a subtractor 312 to calculate the difference between the two signals and generate an difference signal 314. This difference signal 314 is then compared to a threshold. If the difference signal 314 is larger than the threshold, then the return radar signal is authenticated to be the return of the originally emitted radar signal reflected from the target. However, if the difference signal 314 is smaller than the threshold, then the return radar signal is deemed to be spoofed and the process of the target detection may be repeated again. In some embodiments, the threshold may be dynamically adjusted depending on the environment, target type and/or the approximate distance to the target.

In some embodiments, the radar receiver performs hypothesis testing to determine whether or not the return signal is being spoofed. As shown in FIG. 3, there are three beams exiting the OPA device 304: output pump signal 305, output idler signal 307, and output signal 309. The intensities of the idler and signal beams are both measured in optical detectors 308 and 310. The difference between the output electrical signal from those detectors is then measured by the subtractor 312. The intensity of that output signal 314 can then determine whether the return signal is authentic (that is, the signal photons sent from the transmitter are returned), or spoofed (that is, the signal photons sent from the transmitter are NOT returned and instead it has been replaced by another signal).

Figure 4:
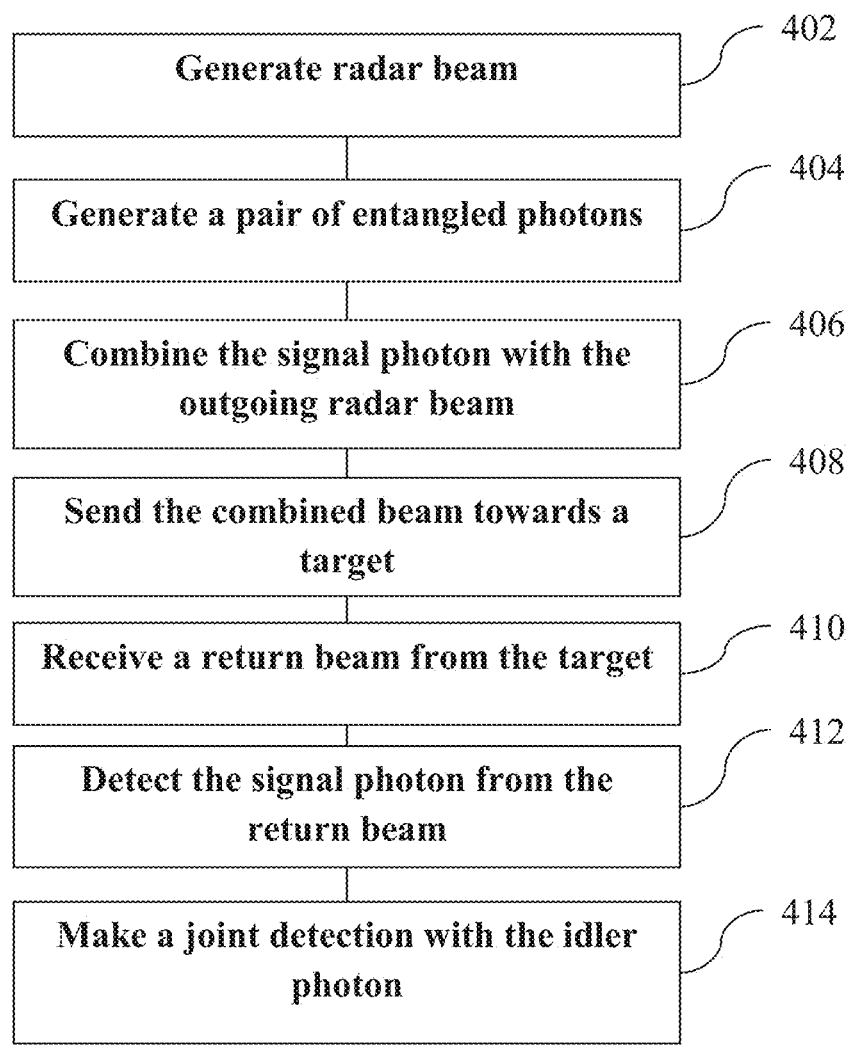
FIG. 4 is an exemplary process flow, according to some embodiments of the present invention.

FIG. 4 is an exemplary process flow, according to some embodiments of the present invention. The exemplary process flow illustrates a method for authenticating a radar return signal. As shown in block 402, an outgoing radar beam is generated according to the conventional radars and techniques therein. The radar beam may be an EM signal for example a laser or RF signal. In block 404, a pair of entangled photons comprising a signal photon and an idler photon are generated. There are various known techniques to generate entangled photons. One example is using spontaneous parametric down-conversion (SPDC) in nonlinear crystals where a pump laser photon is converted within the crystal to generate two entangled photons. The photons can be entangled in their polarization states, their optical phase, and/or their frequencies.

The signal photon is then combined with the outgoing radar beam to generate a combined beam that includes both the radar (EM) beam and the signal photon, in block 406. The signal photon and radar pulse can be combined with any device used to linearly add analog signals, such as a beam-splitter for combining optical signals, or a power splitter/combiner for combining signals at RF frequencies. The combined beam is then sent towards a target to be detected and/or characterized, in block 408. In block 410, the combined beam is returned and received by a conventional radar receiver and a quantum illumination receiver as a return beam. The signal photon is then distinguished from the radar return using the quantum illumination receiver. In some embodiments, the signal photon is sent out, after the radar has already identified a target. Then, the quantum protocol described above is utilized to verify that the return signal is authentic.

In block 412, the signal photon is then detected from the return beam by a quantum illumination receiver. The detected signal photon is then compared to the idler photon (or jointly detected with the idler photon), which may have been stored in a quantum memory, to authenticate the return beam. That is, the quantum illumination receiver makes a joint detection with the idler signal. If the two photons which were originally entangled at the transmitter do not yield a correlation in the quantum illumination receiver, there is a strong indication that the return beam (to be processed by the radar system) is not an authentic reflection of the outgoing radar beam and thus the result of spoofing. In this case, the radar system looks for the "real" return signal, for example, by repeating the above process.

One example of a joint detection receiver is the use of an optical parametric amplifier (OPA) where the output intensity from the amplifier is a strong function of the correlation between the signal and idler. If the signal and idler were generated from the same source, then the correlation between the two is strong, and that correlation can be measured at the output of the OPA.

The quantum entanglement authentication method of the present invention is applicable to the optical or electrical signals in a wide spectrum. That is, the radar may be operating in an optical domain or in an electrical domain. There are a variety of known ways to generate the photon entanglement, given that the outgoing photon needs to be at the same frequency as the frequency of the radar signal. In the case of an optical (e.g., laser) radar signal, the entanglement source may use $\kappa^2$ or $\kappa^3$ type of non-linearity processes in nonlinear material, such a crystals. The quantum memory or a tunable delay for the idler photon may be implemented as a fiber delay, slow light in fiber, or on-chip micro-ring resonator delays. In such cases, the parametric amplification may be performed also using $\kappa^2$ or $\kappa^3$ type of non-linearity processes in nonlinear material, such a crystals.

As describe above, the parametric amplification is performed in the receiver to detect and compare the two photons. The (single) photon detection may be performed by superconducting nanowires, or semiconductor avalanche photodiodes (APDs). For example, since superconducting nano-wire single photon detectors are nanofabricated superconducting wires, they are capable of absorbing optical photons. When the nano-wire absorbs a single photon, the superconducting state is temporarily suppressed, and a transient voltage is generated, heralding the detection of a single photon. Superconducting nanowire detectors have been demonstrated to detect single photon in a spectrum from the visible all the way to the mid-wave infrared.

APDs are compound semiconductor devices, that can be operated in the Geiger-mode (reverse-biased mode). When operated in the Geiger-mode, these APDs can have single photon sensitivity, resulting in a transient avalanche current through the detector upon absorption of a single photon. APDs in Silicon can detect single photons in the visible region of the spectrum, and APDs fabricated in InGaAs can detect single photons in the near-infrared region of the spectrum.

In the case of an electrical (e.g., X-band) radar signal, the entanglement source may be provided by squeezing in phase sensitive amplifiers. The quantum memory or a tunable delay for the idler photon may be implemented as slow light in atomic media, or artificial atoms. For example, it is known that using nonlinear processes in quantum systems can be an implementation for coherently storing quantum states of photons. Optical photons can be stored in the quantum structure of an atom, or atomic ensemble. In the RF frequencies, artificial atoms can be used to store single photons. For example, superconducting circuits can have quantum energy states the frequencies of which match RF photons. RF photons can be stored in these energy state for a programmed amount of time, thus implementing a tunable delay. The (single) photon detection may be performed by superconducting circuits or Graphene. Graphene is pure carbon in the form of a very thin, nearly transparent sheet, one atom thick, which conducts heat and electricity with great efficiency. graphene has a remarkably high electron mobility at room temperature and its optical properties produce an unexpectedly high opacity for an atomic monolayer in vacuum.

It will be recognized by those skilled in the art that various modifications may be made to the illustrated and other embodiments of the invention described above, without departing from the broad inventive step thereof. It will be understood therefore that the invention is not limited to the particular embodiments or arrangements disclosed, but is rather intended to cover any changes, adaptations or modifications which are within the scope of the invention as defined by the appended claims. For example, the methods and systems described herein may be employed in any optical, electrical, or electro-optical system, without limitation. More specifically, the methods and systems described herein may be employed across any electro-magnetic spectrum optimal for a given sensing system.

What is claimed is:

1. A method for authenticating a signal, the method comprising:
    generating an outgoing pulse signal;
    generating a pair of entangled photons comprising a first photon and a second photon;
    combining the first photon with the outgoing pulse signal to generate a combined beam;
    sending the combined beam towards a target;
    receiving a return beam;
    determine whether the return beam includes the first photon; and
    authenticating the return beam when the return beam includes the first photon.

2. The method of claim 1, further comprising establishing that the return beam is not an authentic reflection of the outgoing radar beam, when a joint detection by a quantum illumination receiver does not yield a correlation in the quantum illumination receiver.

3. The method of claim 1, wherein generating a pair of entangled photons further comprises generating a signal photon and an idler photon using spontaneous parametric down-conversion (SPDC) in nonlinear crystals by a pump laser photon converted within a crystal.

4. The method of claim 1, wherein the pair of entangled photons are entangled in one or more of their polarization states, their optical phase, and their frequencies.

5. The method of claim 3, wherein making a joint detection further comprises measuring an output intensity of an optical parametric amplifier (OPA) to determine a correlation between the signal photon and the and idler photon.

6. The method of claim 1, further comprising storing the second photon in a quantum memory.

7. The method of claim 1, further comprising delaying the second photon using a tunable fiber delay.

8. The method of claim 1, wherein the outgoing pulse signal and the return beam are laser beams of a radar or LADAR system.

9. The method of claim 1, wherein the outgoing pulse signal and the return beam are electromagnetic signals.

10. An apparatus for authenticating a signal comprising:
    a signal generation circuit for generating an outgoing pulse signal;
    an entanglement generation device for generating a pair of entangled photons comprising a first photon and a second photon;
    a combiner for combining the first photon with the outgoing pulse signal to generate a combined beam;
    a transmitter for sending the combined beam towards a target;
    a receiver for receiving a return beam; and
    a processor for determine whether the return beam includes the first photon and authenticating the return beam when the return beam includes the first photon.

11. The apparatus of claim 10, wherein the processor establishes that the return beam is not an authentic reflection of the outgoing pulse signal, when a joint detection signal value is smaller than a predetermined threshold.

12. The apparatus of claim 10, further comprising a quantum illumination receiver for detecting the first photon from the return beam and making a joint detection with the second photon, wherein the quantum illumination receiver further comprises:
    an optical parametric amplification (OPA) device for detecting quantum illuminations of the second photon and the return signal and generating a first mixture signal of the second photon and the return signal and a second mixture signal of the second photon and the return signal;
    a first optical detector for detecting the intensity of the first mixture signal and converting the intensity to a first electrical signal;
    a second optical detector for detecting the intensity of the second mixture signal and converting the intensity to a second electrical signal; and
    a subtractor for outputting a difference signal representing the difference between the first and the second electrical signals.

13. The apparatus of claim 12, wherein the OPA device uses a $\kappa^2$ or $\kappa^3$ type of non-linearity to generate the first and the second mixture signals.

14. The apparatus of claim 10, further comprising a quantum memory for storing the second photon.

15. The apparatus of claim 10, further comprising a tunable delay for delaying the second photon.

16. The apparatus of claim 10, wherein the outgoing pulse signal and the return beam are laser beams of a radar or LADAR.

17. The apparatus of claim 10, wherein the outgoing pulse signal and the return beam are electromagnetic signals.

18. The apparatus of claim 10, wherein the apparatus is an optical radar and the combiner is a beam splitter.

19. The apparatus of claim 10, wherein the apparatus is an RF radar and the combiner is a resistive splitter/combiner network.

20. The apparatus of claim 12, wherein the quantum illumination receiver comprises an optical parametric amplifier (OPA) to generate an output intensity to determine a correlation between the first photon and the and second photon.

\* \* \* \* \*